United States Patent [19]

Cheng et al.

[11] Patent Number: 5,365,253
[45] Date of Patent: Nov. 15, 1994

[54] DIGITIZER DEVICE WITH ANTI-NOISE AND STATUS DISPLAY

[75] Inventors: Robert Cheng, Taipei; Robin Chen, Chia Yi; Michael Su, Taipei; Chuen-Jing Horng, Chang Hua, all of Taiwan, Prov. of China

[73] Assignee: Wintime Technology Inc., Hsin Tien-Taipei, Taiwan, Prov. of China

[21] Appl. No.: 974,881

[22] Filed: Nov. 12, 1992

[51] Int. Cl.⁵ ............................................. G09G 3/02
[52] U.S. Cl. ...................................... 345/156; 178/18
[58] Field of Search .................... 340/706, 707, 712; 178/18, 19; 345/156, 157, 173

[56] References Cited

U.S. PATENT DOCUMENTS

| | | | |
|---|---|---|---|
| 4,534,060 | 8/1985 | Ward | 178/18 |
| 4,742,473 | 5/1988 | Shurar et al. | 345/156 |
| 4,859,814 | 8/1989 | Sciacero et al. | 178/19 |
| 4,910,363 | 3/1990 | Kobayashi et al. | 178/18 |
| 5,083,118 | 1/1992 | Kazama | 340/706 |
| 5,191,175 | 3/1993 | Protheroe et al. | 178/18 |
| 5,218,174 | 6/1993 | Gray et al. | 178/18 |

*Primary Examiner*—Ulysses Weldon
*Assistant Examiner*—Amare Mengistu
*Attorney, Agent, or Firm*—Jacobson, Price, Holman & Stern

[57] ABSTRACT

A digitizer device with anti-noise and status display having a hardware circuit controlled by a software program to eliminate outside noises. The system includes a cursor control mouse or stylus which emits an oscillating signal at several hundred KHz to induce a X-Y grid, an anti-noise circuit which eliminates outside noises from the induced signal, an ADC converter which converts the induced signal into a digital signal, a microcontroller unit which calculates the induced signal into corresponding X-Y axis coordinate value, and a display which shows the current status of the digitizer.

3 Claims, 3 Drawing Sheets

DIGITIZER DEVICE WITH ANTI-NOISE AND STATUS DISPLAY

BACKGROUND OF THE INVENTION

1. Field of the Invention

The present invention relates to a digitizer device with anti-noise and status display which uses a hardware circuit controlled by a software program to eliminate outside noises and show the current status of the digitizer.

2. Description of the Prior Art

A digitizer generally comprises a X-Y grid, a signal emitter which may be a cursor control mouse or stylus and is controlled to project an oscillating signal onto the X-Y grid through a magnetic induction process, X-Y grid selectors which scan the signal induced onto the X-Y grid, am amplifier and filter circuit which processes the signal detected by the X-Y grid selectors into a low frequency signal, an analog/digital converter which converts the low frequency signal into a digital signal, and a microcontroller unit which calculates the digital signal so as to provide a corresponding coordinate value. The X-Y grid, as shown in FIG. 4, has X-axis conductors and Y-axis conductors horizontally or vertically arranged on a board at right angles. These conductors inductively receive the emitting signal of a stylus or mouse and also inductively receive outside frequency (for example: CRT monitor), thereby causing the coordinate value to be unstable. Therefore, this structure of digitizer can not accurately point out the coordinate value. Furthermore, when the coordinate value is read out, it must be displayed through the screen of the host computer.

SUMMARY OF THE INVENTION

The present invention eliminates the aforesaid disadvantages of the prior art digitizer. The present invention uses an anti-noise circuit controlled by a software program to eliminate the interference from outside noises. The mouse or stylus is defined to emit an oscillating frequency at several hundred KHz (the frequency from a CRT monitor is about 15 KHz–150 KHz). When the X-Y grid of the digitizer receives a signal from the mouse or stylus, the anti-noise circuit attenuates the noises induced by the CRT monitor or any other outside source so as to greatly increase the signal noise ratio. After having been treated through a phase converter and a filter, a stable low frequency signal is obtained and then sent to a level recognizer for permitting the signal to be converted into a digital pulse signal for controlling the data counter to stop it from counting, and then the signal is sent to a microcontroller unit for calculation. After calculation, the microcontroller unit gives the correct X-Y coordinate value to the host computer. The built-in software program of the microcontroller unit defines the time in scanning one line of the X-Y grid to be n times longer than the cycling period of the signal emitting source - - - a mouse or stylus. A greater n value produces a better result. However, the maximum counting value of the X-Y axis data counter shall be taken into account so as to prevent the occurrence of overflow. This sampling method stabilizes received X-Y coordinate value and eliminates the interference of outside noises with X-Y coordinate value. By means of repeatedly scanning the X-Y grid and calculating the data thus obtained through a convergence function, accurate X-Y coordinate value is ensured. A display is incorporated to the digitizer to show if the mouse or stylus is within or beyond the grid, if the digitizer is for horizontal or vertical use (for example: 9"×6" or 6"×9"), if the X-Y coordinate value which was sent by the digitizer to the host computer is a relative value or absolute value. Therefore, a user can clearly see the current status of the digitizer so as to prevent a misuse.

DETAILED DESCRIPTION OF THE PREFERRED EMBODIMENT

Figure 1:
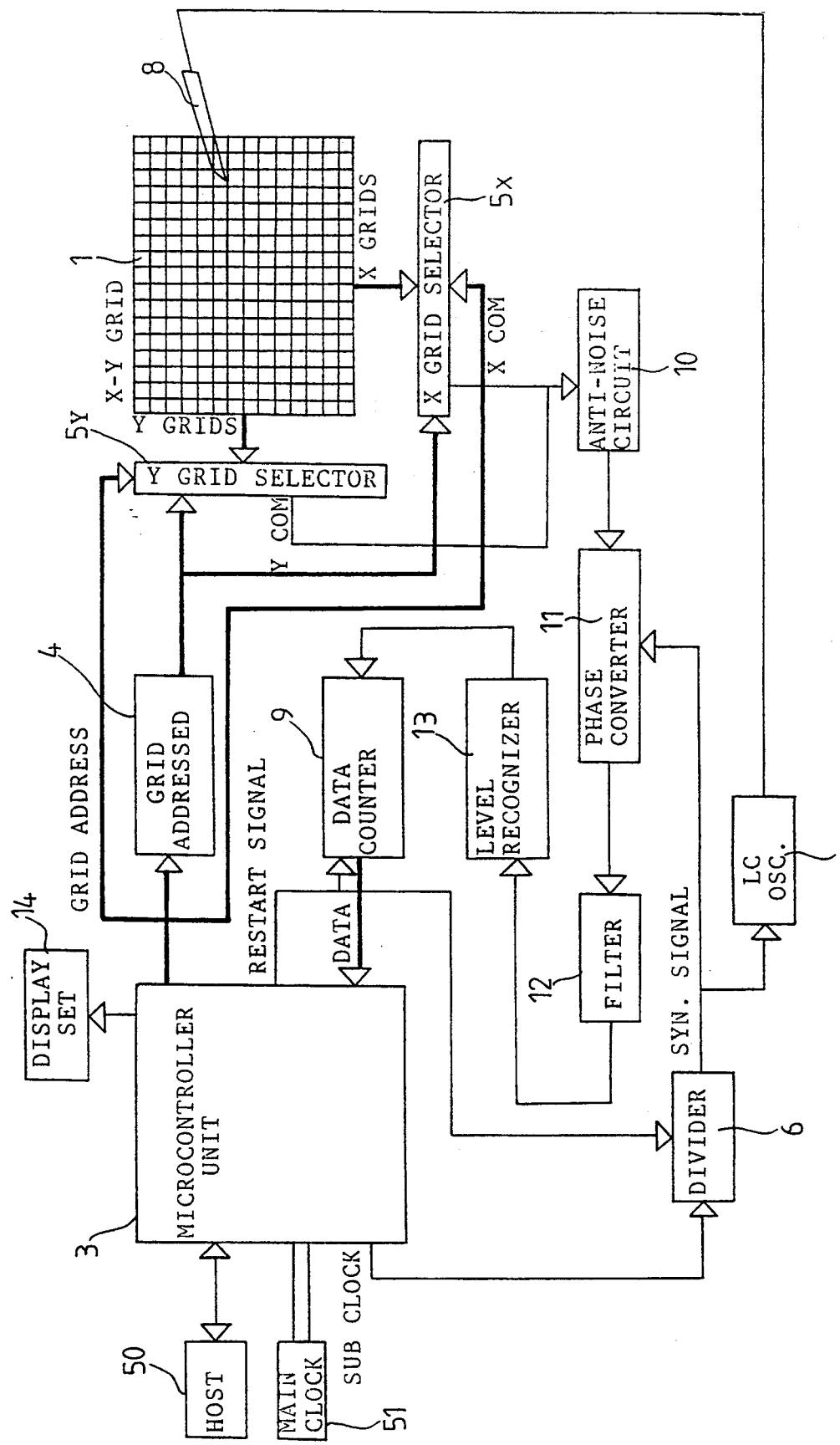
FIG. 1 is a block diagram according to the present invention.
Figure 4:
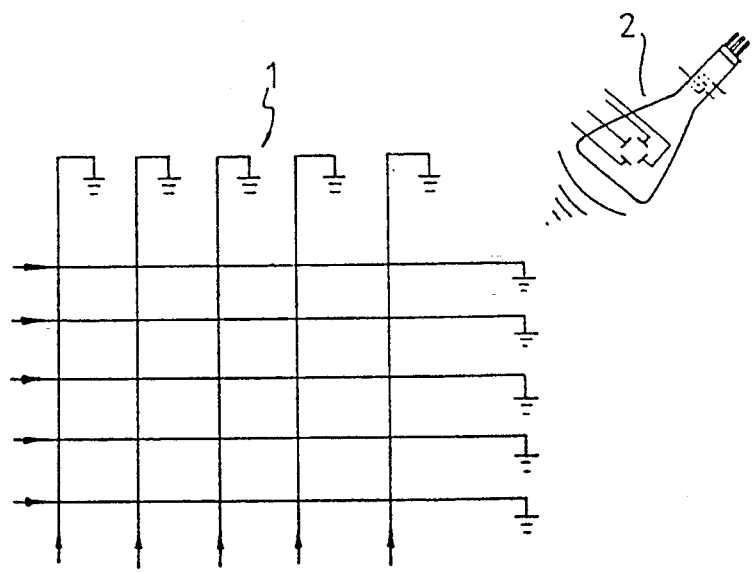
FIG. 4 illustrates the arrangement of the X-Y grid of a digitizer according to the prior art.

Referring to FIG. 1, the microcontroller unit 3 of the digitizer device is respectively connected to a host computer 50, and a main clock 51, which provides pulse waves. The microcontroller unit 3 provides a X-Y grid address to a Y grid selector 5Y, a X grid selector 5X and a grid addressed 4, which determines the X,Y axis scanning sequence, and simultaneously sends a secondary pulse signal to a frequency divider 6. After treated through the frequency divider 6, the secondary pulse signal (about several hundred KHz) from the microcontroller unit 3 is provided to a LC oscillator 7 and used as the reference frequency for a mouse (stylus) 8. At this moment, the microcontroller unit 3 sends a start signal to a data counter 9 and the frequency divider 6 respectively, causing the data counter 9 and the frequency divider 6 to reset. After setting, the data counter 9 starts to count. If the mouse (stylus) 8 projects a signal onto the X-Y grid 1 of the digitizer, the data counter 9 immediately counts out the value. Once the mouse (stylus) 8 gives a signal to the X-Y grid 1, the X-Y grid 1 immediately inductively receives the signal, and the induced signal is then sent to an anti-noise circuit 10 (which is consisted of passive components and amplifiers) through the Y grid selector 5Y and the X grid selector 5X respectively. The anti-noise circuit 10 attenuates external noises of frequency beyond the range of 15 KHz to 150 KHz, for example, from a CRT monitor, so as to eliminate external frequencies (from CRT monitor or other interference sources) and improve the signal noise ratio. The well-treated signal from the mouse (stylus) 8 is then sent with the synchronous signal (reference frequency) of the frequency divider 6 to a phase converter 11. The signal after through the phase converter 11 is then sent to a low pass filter 12 for low pass filtration. After treated through the low pass filter 12, the signal is then sent to a level recognizer 13 and converted into a digital pulse signal for controlling the data counter 9 to stop from counting and simultaneously driving it to send the data thus obtained to the microcontroller unit 3 for calculating accurate X-Y value. After calculation, the microcontroller unit 3 sends the result to the host computer 50 and shows the current status of the digitizer through a display set 14.

The digitizer provides operating modes and status information regarding:

1) whether the mouse (stylus) is within or beyond the induction area of the digitizer;

2) The location of the origin X-Y axis, namely, whether the origin is at the upper left corner or the lower left corner; and 3) the format of the X-Y coordinate value regarding whether it is of absolute value or relative value These three statuses may be displayed through a two-state display method, for example: a light signal with on/off control.

After counting, the microcontroller unit 3 immediately resets the data counter 9 and the frequency divider 6. The mouse (stylus) 8 is then moved on the X-Y grid 1, causing the induced signal (X-Y coordinate data) to be changed, and the X-Y coordinate data is read out again according to the aforesaid procedures.

Figure 2:
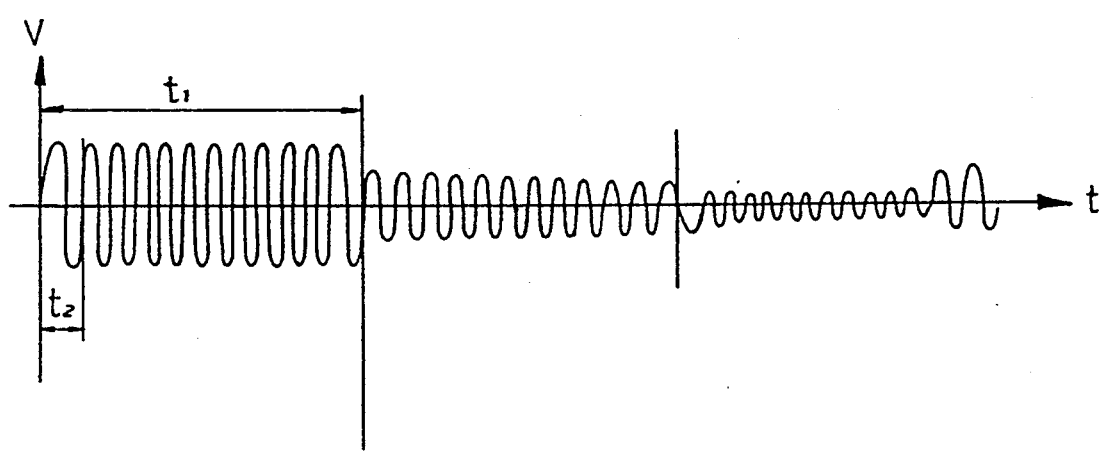
FIG. 2 illustrates the relative relation between the cycling of the emitting source of the mouse (stylus) 8 (through LC parallel resonance) and the time in scanning one line of the X-Y grid.

FIG. 2 shows the relative relation between the time spent by the emitting source of the mouse (stylus) 8 made through LC parallel resonance and the time spent in scanning one line of the X-Y grid 1. According to experiments, the time in scanning one line of the X-Y grid 1 is "n" times longer than the cycling period of the LC oscillator 7. Presume that the time in scanning one line of the X-Y grid 1 is t1, the cycling of the LC oscillator 7 is t2, thus $t1=nt2$, $n \geq 2$. From this equation, it is known:

1) The bigger the value of "n", the greater the value obtained through the counter, and the X,Y value converted for the resolution becomes more stable;

2) The probability of unsteadiness of the X,Y value almost remains unchanged when the value of "n" is changed, therefore it is advised to take the value of "n" maximum possible so that the calculated X,Y value can be more stable.

In order to fit the maximum counting value of the circuit of the present invention and prevent the occurrence of overflow, the value of "n" may be set at 12. By means of the operation of the built-in software program of the microcontroller unit 3 and the anti-noise circuit, the gain of outside noises interfering with the digitizer is greatly reduced. This anti-noise technique is called "convergence technique", for which we provide a weighted function. For different convergence considerations, different weighted value is given to the function, which is described in an equation as follows:

$$Xn' = \frac{g(n)Xn - 1' + h(n)Xn}{g(n) + h(n)}$$

wherein:

$X0' = X0 = 0$ $Xn'$ = the convergence value of the n scanning $Xn$ = the value obtained from the n scanning $g(n)$ = the weighting for the convergence value at $n-1$ $h(n)$ = the weighting for the n scanning $n = 1, 2, 3, \ldots$ In the above equation, the mouse (stylus) 8 is fixed on the X-Y grid 1 at a location, then the X,Y grid is continuously scanned for n times, and then the relative value is continuously obtained through the data counter for calculation, From the above equation, it can be obtained that:

When $g(n)=1$, $h(n)=1$, thus, $$Xn' = \frac{Xn - 1' + Xn}{2}$$

therefore, an almost accurate X,Y value which is free from the interference of outside noises is obtained.

Figure 3:
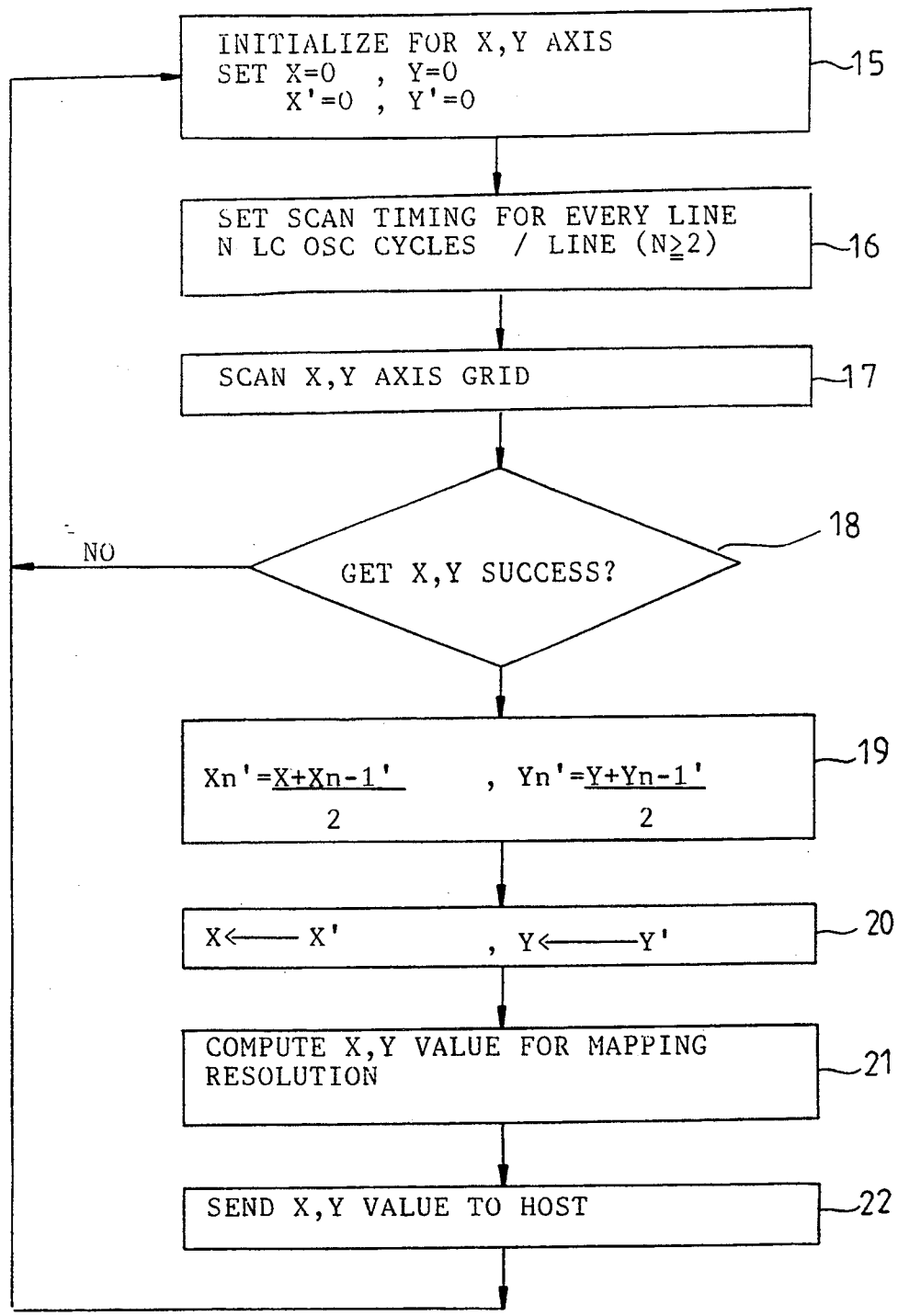
FIG. 3 is a flow chart showing the operation of the built-in software program of the microcontroller unit in calculating X-Y coordinate value.

Referring to FIG. 3, therein illustrated is the flow chart of the operation of the built-in program of the microcontroller unit 3 in calculating X-Y coordinate values. As the system is initialized 15, the program sets X, Y axis value for permitting the scanning value to be $X=0$, $Y=0$ and the display value to be $X'=0$, $Y'=0$, then sets scan time for every line 16 to be how many LC oscillator cycles. Then, the program enters the step of scanning X,Y grid 17, and then proceed to the step of judging if grid tracking X,Y successful 18. The program will then proceed to the next step 19 if the mouse (stylus) is located within the inductance range of the digitizer. If the mouse (stylus) is not located within the inductance range of the digitizer, the program will return to step 17 to scan X,Y grid. When the step 19 is entered, the scanned value is calculated through the equation of $Xn' = g(n)Xn - 1' + h(n)Xn/g(n) + h(n)$, so as to obtain the internal value for X axis and Y axis respectively. The internal value for X, Y axis thus obtained is then sent to $X \leftarrow X'$, $Y \leftarrow Y'$, in step 20, then X,Y value is computed for mapping the resolution in step 21, and then the X,Y value is sent to the host computer in step 22 for display. After the step 22, the program returns to the initial step 15 to proceed to another cycle.

What is claimed is:

1. A digitizer device with an anti-noise circuit and a status display unit, comprising a digitizer having a microcontroller unit respectively connected to a host computer and a main clock, wherein the digitizer has a hardware circuit incorporated with a software program built in the microcontroller unit to protect against outside noise so as to ensure the stability of coordinate values, said status display unit being connected to said microcontroller unit in order to show the current status and operating mode of the digitizer, wherein:

the hardware circuit of said digitizer drives said microcontroller unit to provide a X, Y grid address to a Y grid selector, a X grid selector and a scanning sequence determining grid addresser and sends a secondary pulse signal to an LC oscillator through a frequency divider for use as a reference frequency for a mouse (or stylus), and then said microcontroller unit is controlled to send a start signal to reset a data counter and said frequency divider, thereby causing said data counter to start counting the value as the mouse (or stylus) projects a signal onto an X-Y grid of the digitizer, an induced signal from the digitizer being then sent to the anti-noise circuit through a Y grid selector and a X grid selector, thereby causing the anti-noise circuit to attenuate outside noises of frequency beyond the range of 15 KHz to 150 KHz, so as to eliminate the frequencies other than that emitted through the mouse (or stylus) and improve a signal-to-noise ratio, the signal from said anti-noise circuit being then sent with a synchronous signal from said frequency divider to a phase converter for phase separation and then to a low pass filter for low pass filtration so as to define a low frequency signal, the low frequency signal being then sent to a level recognizer and then converted into a digital pulse signal for controlling said data counter to stop from counting and simultaneously driving it to send counted data to said microcontroller unit for calculating accurate X-Y values for permitting said microcontroller unit to send the calculated result to said host computer and show the current status of the digitizer through said status display unit.

2. A digitizer device with an anti-noise circuit and a status display unit, comprising a digitizer having a microcontroller unit respectively connected to a host computer and a main clock, wherein the digitizer has a hardware circuit incorporated with a software program built in the microcontroller unit to protect against outside noise so as to ensure the stability of coordinate values, said status display unit being connected to said microcontroller unit in order to show the current status and operating mode of the digitizer, wherein:

said software program uses a convergence technique in calculating coordinate values and reducing the gain of outside noises in interfering with the digitizer by fixing the mouse (or stylus) on the X-Y grid and continuously scanning the X-Y grid for n times and then letting the scanned result be counted by said data counter for calculation, said convergence technique providing a weighted function to give a different weighted value to the function according to different convergence considerations so as to obtain an accurate and stable X-Y value, the function being:

$$Xn' = \frac{g(n)Xn - 1' + h(n)Xn}{g(n) = h(n)}$$

wherein:
$X0' = X0 = 0$
$Xn'$ = the convergence value of the n scanning
$Xn$ = the value obtained from the n scanning
$g(n)$ = the weighting for the convergence value at $n-1$
$h(n)$ = the weighting for the n scanning $n = 1, 2, 3, ..$ such that:
when $g(n) = 1$ and $h(n) = 1$, $$Xn' = \frac{Xn - 1' + Xn}{2}$$

and an accurate X,Y value which is free from the interference of outside noises is obtained.

3. A digitizer device with an anti-noise circuit and a status display unit, comprising a digitizer having a microcontroller unit respectively connected to a host computer and a main clock, wherein the digitizer has a hardware circuit incorporated with a software program built in the microcontroller unit to protect against outside noise so as to ensure the stability of coordinate values, said status display unit being connected to said microcontroller unit in order to show the current status and operating mode of the digitizer, wherein:

said mouse (stylus) includes a signal emitting source using LC parallel resonance and wherein the relative relation between the cycling of the signal emitting source through LC parallel resonance and the time in scanning one line of the X-Y grid is:

$$t1 = nt2, n > 2,$$

in which
$t1$ = timing in scanning one line of the X-Y grid;
$t2$ = cycling of the mouse (stylus); and wherein the bigger the n value, the better the calculation result; the value obtained from said data counter being adjusted by a multiplying power and then converted into a corresponding X-Y coordinate value of high stability and resolution.

* * * * *